Aug. 13, 1963 R. A. RICHARDSON ETAL 3,100,871

SINGLE SIDEBAND RECEIVER HAVING SQUELCH AND PHASE-LOCKED DETECTION MEANS

Filed Jan. 3, 1961 4 Sheets-Sheet 1

INVENTORS
Roy A. Richardson
Orville M. Eness
BY
Mueller & Aichele
Attys.

INVENTORS
Roy A. Richardson
Orville M. Eness
BY Mueller & Aichele
Attys.

INVENTORS
Roy A. Richardson
Orville M. Eness
BY
Mueller & Aichele
Attys.

INVENTORS
Roy A. Richardson
BY Orville M. Eness
Mueller & Aichele
Attys.

United States Patent Office 3,100,871

Patented Aug. 13, 1963

3,100,871

SINGLE SIDEBAND RECEIVER HAVING SQUELCH AND PHASE-LOCKED DETECTION MEANS

Roy A. Richardson, Skokie, and Orville M. Eness, Chicago, Ill., assignors to Motorola, Inc., Chicago, Ill., a corporation of Illinois Filed Jan. 3, 1961, Ser. No. 80,493

9 Claims. (Cl. 325—330)

This invention relates to communication systems and more particularly to 2-way communication systems utilizing single sideband signals. This application is a continuation in part of our application Serial No. 688,668, filed October 7, 1957.

Due to the presently crowded condition of the radio frequency spectrum, effort is being made to reduce the bandwidth of communication signals in order to minimize spectrum requirements for each channel. Single sideband (SSB) signals can be used in channels of relatively narrow bandwidth and, at the same time, offer possibilities for more efficient use of transmitter power. However, adoption of single sideband equipment also presents problems in using the transmitter power to best advantage. Lack of oscillator stability may prevent successful use of suppressed carrier single sideband signals (where the carrier is absent for practical purposes) since a carrier must be reinserted for detection of the signals at the receiver and stability of the oscillators required in the system is generally insufficient to insure desirable recovery of modulation. It can be shown that drift of 50 cycles per second can cause impairment of the demodulated signals, and drift greater than this eventually renders the signals unusable. For example, with a carrier operating in the 150 megacycle range, oscillator drift of .00002% may be the permissible limit for intelligibility. Furthermore, a satisfactory solution is not obtained by transmitting the usual carrier of full power with modulation in only one sideband since the amount of sideband power available, from the transmitter decreases as the carrier power is increased and carriers of more power may have adverse effects on interchannel interference.

An object of the invention is to provide a single sideband communication system which overcomes carrier recovery problems at various carrier frequencies, including the VHF range, so that oscillator stability requirements are not severe.

A further object is to provide a single sideband communication system which permits use of present day oscillators having stability characteristics normally insufficient for use in suppressed carrier single sideband systems.

A further object of the invention is to provide an oscillator system in the carrier restoration circuit which readily permits phase-locking to the incoming carrier but effectively prevents locking to component sideband signals.

A further object is to provide a pilot or reduced carrier SSB system wherein carrier restoring is effected at the receiver by a circuit which also derives the sideband modulation information, thus simplifying the circuitry of the receiver.

A still further object is to provide an SSB communication system wherein the carrier restoring circuit of the receiver also produces information for operating a squelch system of the receiver.

Still another object is to provide an improved squelch control circuit for a receiver which circuit is constructed to operate on carrier signals of a level at or below the noise level in the receiver.

A feature of the invention is the provision of an SSB communication system wherein the signals is transmitted with a pilot or reduced carrier so that the carrier may be stored and the signal demodulated at the receiver all by a single phase locking circuit.

A further feature is the provision of a pilot carrier SSB communiction system wherein the carrier is recovered at the receiver in a phase locking system and the presence thereof is detected to operate a squelch control circuit of the receiver.

A still further feature of the invention is the provision of a phase detector in an automatic phase control loop of an SSB receiver which detector provides both a control potential for controlling an oscillator to supply a reference signal for detection purposes and demodulation of the receiver SSB signal by means of synchronous detection thereof.

A further feature in one form of the invention is the provision of two crystal oscillators in the automatic phase control circuit, operating in combination and having an operating range sufficient to facilitate phase-locking to the incoming carrier but also restricted in operating range to prevent locking to any component sideband signals.

A further feature of the invention is the provision of a squelch control circuit for a receiver wherein the desired signal is used to phase-lock a reference signal and a phase detector is used to identify the locked, or inphase, condition of the reference signal and the received carried to unsquelch the receiver.

Further objects, features and the attending advantages of the invention will be apparent upon consideration of the following description when taken in conjunction with the accompanying drawings in which.

In the preferred form of the invention, a communication signal is utilized which includes a pilot, or reduced, carrier modulated by information in one sideband thereof. The power of the carrier is in the range of 13–20 db below the peak envelope power of the sideband modulation. In the SSB receiver of the invention, the carrier is effectively recovered for detecting purposes by phase-locking a reference signal of a local oscillator thereto in an automatic phase control loop. Accordingly, the system is particularly adapted for mobile communication work, for example, in the VHF range of 160 megacycles, since oscillator stability requirements are such that practical present day circuits may be used.

In phase-locking a reference signal for carrier recovery, the phase control loop preferably comprises a phase detector and a low pass filter to apply the detector output to controllable oscillator means operating at the carrier frequency of the signal to be detected. A buffer amplifier applies the reference signal from the oscillator back to the phase detector. At the output of the phase detector there is also derived, by synchronous detection, audio components of the SSB signal so that modulation of the received signal is recovered without using a separate detector.

The phase locking information of the automatic phase control loop is also used to provide squelch control of the receiver and silence the same in the absence of a received carrier. The locked reference signal is applied to a further phase detector and the incoming carrier is coupled to this phase detector with the same phase as that of the reference signal to develop a squelch control voltage and open the squelch when the two signals exist in an in-phase condition. In the absence of a carrier, the random noise in the receiver produces substantially no control signal in the squelch phase detector so that the presence of a carrier can be detected when its level is at or somewhat below the noise level and the receiver may be unsquelched by a relatively weak signal in the desired receiving channel.

Figure 1:
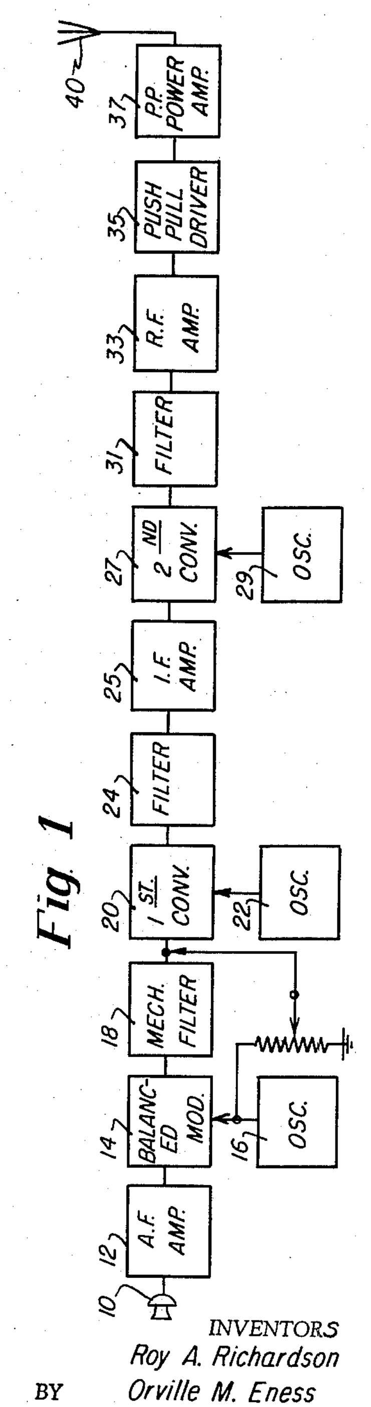
FIG. 1 is a block diagram of a transmitter which may be used in the communication system of the invention.

Referring now to FIG. 1, the transmitter suitable for producing single sideband signals will be explained. Modulation information, such as an audio signal from a microphone 10, is applied to the audio frequency amplifier 12. The output of the amplifier 12 is coupled to a diode ring balanced modulator 14 to which is also applied a signal from oscillator 16. In the modulator 14 the carrier from oscillator 16 is suppressed and the two sidebands are applied to mechanical filter 18 which passes only one of the sidebands and greatly attenuates the other sideband as well as the carrier. To maintain the desired power ratio of carrier to single sideband modulation, provision is made for the correct carrier injection at the input of converter 20 by means of a connection from oscillator 16. In a system operative in the VHF range, direct conversion to the output frequency may not be practical and double conversion may be required, and is shown here. Accordingly, the output of the mechanical filter 18 is supplied to a first converter 20 where the signal is converted to one of higher frequency by an appropriate mixing action with a signal from local oscillator 22. The signal is then fed through filter 24, amplified in intermediate frequency amplifier 25 and applied to a second converter 27. A signal from oscillator 29 is also applied to circuit 27 in order to provide appropriate conversion in second converter 27. The signal may then be of the order of 160 megacycles and is further filtered in filter 31 and amplified in radio frequency amplifier 33. A suitable push-pull driver stage 35 applies the signal to a push-pull power amplifier stage 37 from which it is radiated by antenna 40.

As previously explained it is contemplated that the carrier power be 13–20 db below the peak envelope power of the sideband modulation. It has been found that a signal of this type conserves available transmitter power and yet minimizes the spectrum bandwidth required and reduces the tendency for intermodulation and splatter. Furthermore, as will be explained subsequently, a system using such a pilot, or reduced, carrier also affords satisfactory information for automatic gain control purposes and squelch control at the receiver. Carrier recovery by a phase-locking system, as will also be subsequently explained, tends to eliminate Doppler effects since carrier errors at the receiver are not possible and this renders the system particularly useful for aircraft communication purposes.

In general, with respect to the transmitter, it may be said that harmonic distortion and intermodulation between the carrier and voice modulating signals should be controlled and held to a low order, and this can be accomplished by utilizing linear circuits, or minimizing nonlinearities in the transmitter. Maximum use of the transmitter power can also be made by reducing the dynamic range of the voice, or modulating signals, by means of peak clippers in the audio circuit in order to promote full utilization of the available transmitter power. This also permits limiting of the modulating signals to a value below that at which any given amplifier in the transmitter will operate in a non-linear manner.

Figure 2:
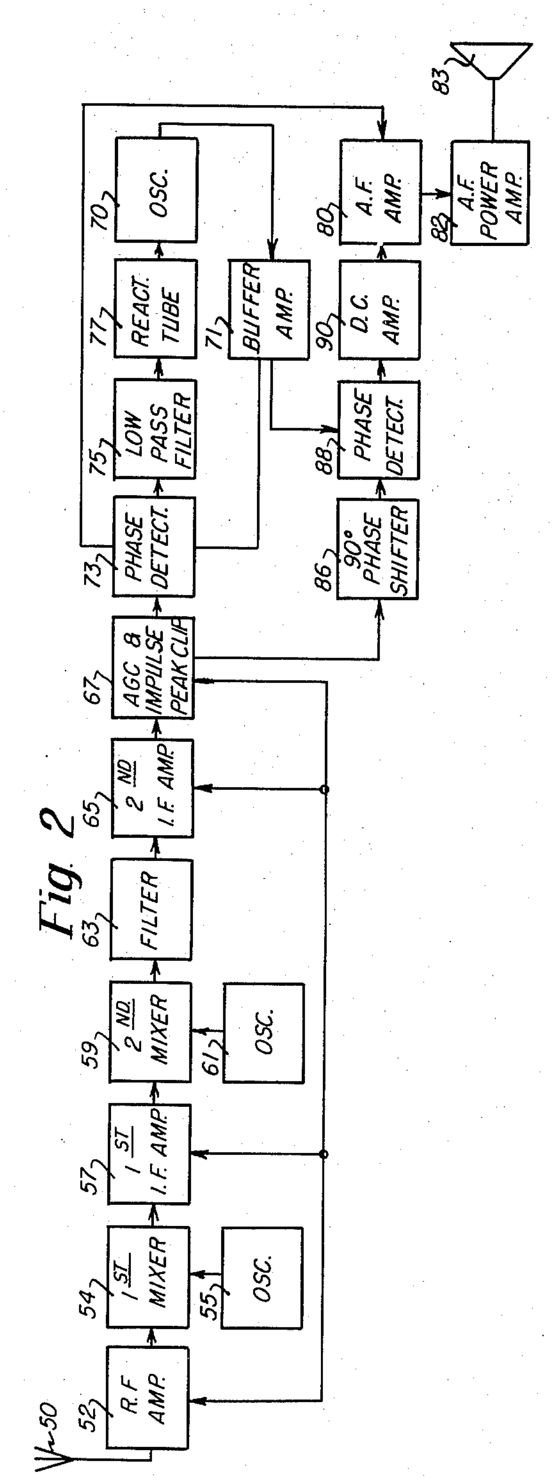
FIG. 2 is a block diagram of a receiver which may be used in the communication system of the invention.

FIG. 2 shows a block diagram of the receiver of the invention and this will be described generally before an explanation is given of certain circuits in more detail. Received signals from antenna 50 are applied to the radio frequency amplifier 52 which couples the signals to a first mixer 54. The output from oscillator 55 is also applied to mixer 54 and the converted signal is applied to first intermediate frequency amplifier 57. The output of amplifier 57 is connected to a second mixer 59 to which is also applied a signal from oscillator 61. The output of mixer 59 is connected to a highly selective filter 63 from which the signal is applied to secondary intermediate frequency amplifier 65. Preferably, the receiver has a minimum of gain prior to the filter 63 in order to reduce the effects of intermodulation of spurious signals with the received signal in the desired channel. The signals amplified in circuit 65 are applied to an automatic gain control and impulse peak clipper circuit 67. The automatic gain control potential developed in circuit 67 is applied to the second intermediate frequency amplifier 65, to the first intermediate frequency amplifier 57 and to the radio frequency amplifier 52. A suitable peak clipper is also included in circuit 67 in order to limit impulse noise accompanying the desired signal.

The signal, at the second intermediate frequency, is then applied to an automatic phase control and detector circuit. It should be noted that the reduced or pilot carrier SSB signal cannot be directly applied to the usual AM detector since the pilot carrier is of insufficient amplitude for proper recovery of modulation information. In the circuit to be described the carrier is separated from the sidebands and effectively restored at a considerably larger amplitude than that of the sidebands in order to reduce to distortion effects present in a reduced carrier signal sideband signal of the type here considered. This, in effect permits detection of the signal with a low modulation percentage thereby reducing distortion and minimizing intermodulation of noise signals in the presence of the restored carrier. Furthermore, the circuit to be described permits utilization of the maximum receiver sensitivity under weak signal conditions since the separated carrier will in effect be amplitude limited to remove amplitude variations due to noise.

Oscillator 70 provides a reference signal which is of the same frequency as that of the desired signal at this point in the receiver, the carrier of which is at the second intermediate frequency. The reference signal from oscillator 70 is applied through a buffer amplifier 71 to the phase detector 73. The desired signal from the second intermediate frequency amplifier is also applied to the phase detector, the output of which is used to insure phase locking of the reference signal at 90° with respect to the desired signal. To accomplish this the output of the phase detector is applied through a low pass filter 75 to a reactance tube 77 which is connected to the oscillator 70 to control the phase of the reference signal. From subsequent explanation it will be apparent that when the desired 90° phase relationship exists the output of phase detector 73 will be a minimum and will tend to maintain the phase locked condition.

In the pre-locked condition when the desired signal is received, the phase detector 73 produces an output which is a sinusoidal voltage at the difference frequency between that of the incoming signal and that of the reference signal from oscillator 70. The sinusoidal voltage is attenuated by low pass filter 75 and appears at the input to the reactance tube 77 which then frequency modulates the oscillator 70 at this frequency. If such frequency modulation is of sufficient magnitude the output of the phase detector 73 is no longer sinusoidal but contains a direct current component which changes the average frequency of the oscillator toward that of the incoming or desired signal carrier. This change in average frequency results in an increase in direct current pull-in voltage. Accordingly, a regenerative action takes place which terminates when the oscillator 70 produces a reference signal which is phase-locked to the incoming signal at the second intermediate frequency. The amount of sinusoidal voltage present at the input of the reactance tube 77 is dependent upon the attenuation characteristics of the filter 75 and the pull-in range of the system is determined mainly by the constants of the low pass filter. This filter also determines the time required for oscillator 70 to phase-lock to the incoming signal from a pre-lock condition. To a lesser extent, the pull-in range and the pull-in time are dependent upon the frequency response of the phase detector 73 and the sensitivity of the reactance tube.

As will be explained in greater detail subsequently, there may also be derived from phase detector 73 the modulation present in the sidebands of the desired signal. This is coupled from the detector 73 to the audio frequency amplifier 80 and from there it is applied to the audio frequency power amplifier 82 and to the loudspeaker 83.

FIG. 2 also shows a squelch control system which utilizes information available in the automatic phase control circuit. The desired signal is applied from circuit 67 to a 90° phase shifter 86 and the output of this circuit is applied to a further phase detector 88. As previously explained, the output of buffer amplifier 71, when the reference signal from oscillator 70 is locked to the desired signal, will be at 90° with respect to the desired signal. The reference signal is also applied from the buffer amplifier 71 to phase detector 88 and phase shifter 86 produces a shift of the desired signals so that the desired signal and the reference signal are applied in the same phase to phase detector 88. Accordingly, in the presence of the carrier of the desired signal, detector 88 produces a direct current output which is amplified in the direct current amplifier 90 and applied as a squelch control voltage to the audio frequency amplifier 80 to unsquelch this circuit or render it operative. Circuit 80 is constructed so that in the absence of the squelch control voltage a vacuum tube utilized therein is biased to cut off, thereby effectively squelching the receiver in a manner known in the art. As will be more apparent from the detailed description of the squelch control system, it is possible to unsquelch the receiver upon reception of a carrier which is at or below the noise level due to the very high selectivity with which the pilot carrier is recovered in the frequency spectrum.

Figures 3, 4, 6, 7:
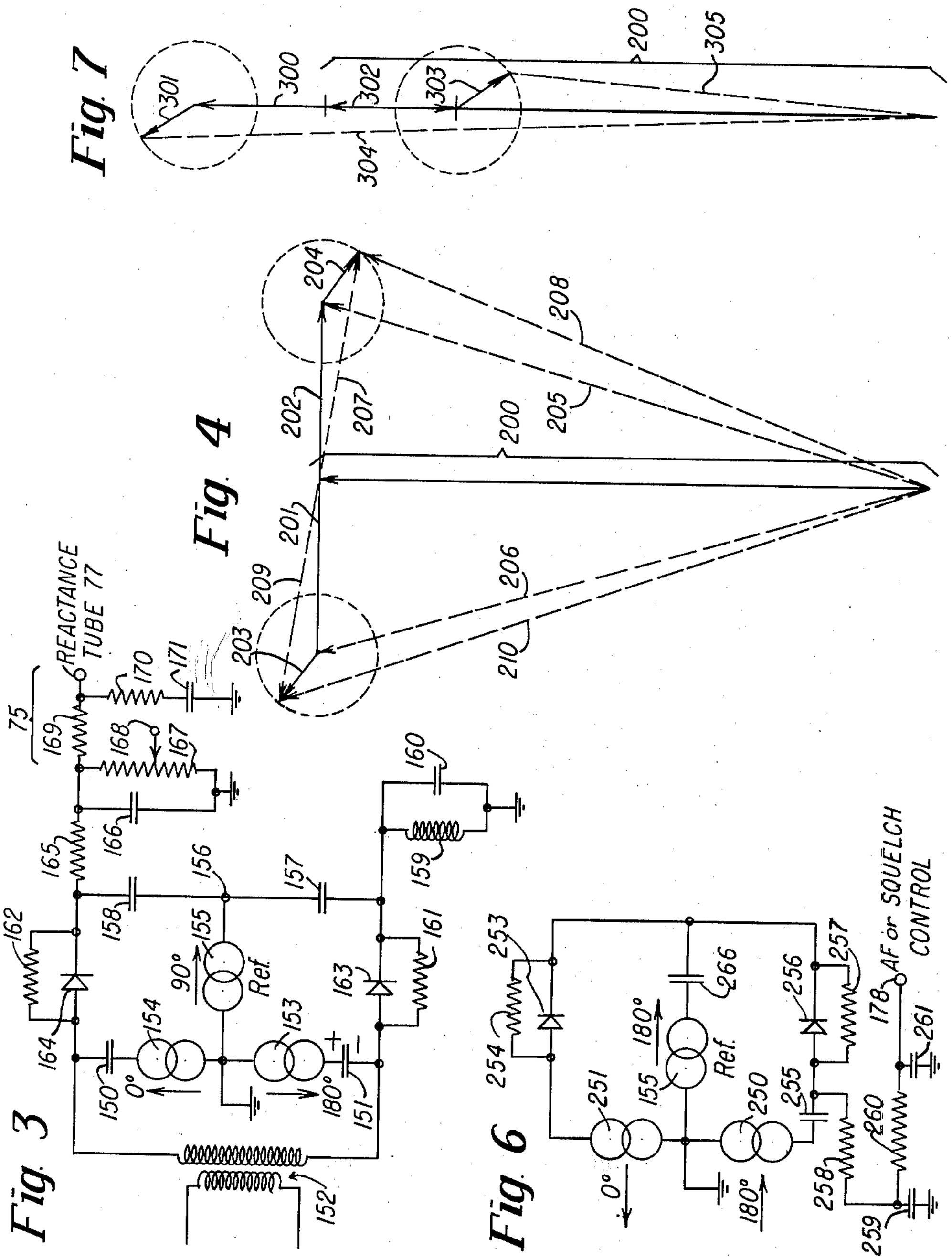
FIG. 3 is a simplified schematic diagram of a phase detector which may be used in practicing the invention.
FIG. 4 is a vector diagram useful in explaining the operation of the circuit of FIGS. 3 and 5.
FIG. 6 is a simplified schematic diagram of a further phase detector used in the receiver of the invention.
FIG. 7 is a vector diagram useful in explaining the operation of the circuit of FIGS. 5 and 6.

FIG. 3 represents the form of phase detector which may be utilized in the circuit of detector 73. The signal from the impulse peak clipper 67 is fed to the phase detector circuits by a tuned transformer 152 and capacitors 150, 151. The voltages generated in this resonant circuit are represented by generators 153 and 154 which produce voltages with respect to the reference ground connection shown at the junction of the generators. These voltages are in 180° phase relationship. A third generator 155, representing the reference signal derived from the oscillator 70 and buffer amplifier 71 of FIG. 1, is shown and this may have a frequency exactly the same as the carrier signals of generators 153 and 154, but at a 90° phase relationship with respect to each of those signals. Generator 155 is shown connected between point 156 and ground. The generators 153 and 155 are connected in series through capacitors 151 and 157 and diode 163. A coil or choke 159 affords a direct current connection to ground for diode 163 and also provides a high impedance path for the reference frequency signal. The voltage developed by generators 153 and 155 is rectified by diode 163 and appears across capacitor 151 and resistor 161.

Capacitor 150 is connected in parallel with capacitor 151 through generators 153, 154 and coil 152, and therefore, is also charged to a voltage equal to the sum of that supplied by generators 155 and 153. The voltage applied to the diode 164 is the sum of generator voltages 154, 155. The sum of these two voltages is rectified and subtracted from the D.C. which appears across capacitor 150 and the resultant potential appears on capacitor 158. Since capacitor 158 is returned to ground through generator 155, the voltage developed across this capacitor is representative of the phase detector output.

Referring now to FIG. 4 and considering the system without modulation components accompanying the received carrier, vector 200 may represent the voltage of reference generator 155, vector 201 the voltage of generator 153 and vector 202 the voltage of generator 154. The peak voltage developed by diode 163 is equal to the vector sum 206 and appears across capacitor 150 and 151. If diode 163 were disconnected the peak voltage developed by diode 164, equal to vector 205, would appear across capacitor 158. When diode 163 is reconnected, the voltage appearing across capacitors 150 and 151 is added to the peak voltage of diode 164. Since the voltage across capacitor 150 and 151 and the peak voltage of diode 164 are equal and opposite the net voltage across capacitor 158 is zero.

The voltage developed across capacitor 158 is therefore zero and the phase detector output is zero when the carrier and reference signals are in phase quadrature. If the carrier phase drifts from a quadrature condition the phase detector output may be either positive or negative depending upon the direction of phase drift. When the phase drifts so that voltages from generators 154 and 155 exceed the voltage across capacitor 150, the output is positive. When the reverse condition exists, the output is negative.

The resistor 165 and capacitor 166 form an RF bypass network to prevent carrier and reference frequency signals from appearing across potentiometer 167. Resistors 169, 170 and capacitor 171 form a sub-audio frequency low pass filter which prevents rapid changes in level at the reactance tube circuit 77, and provide damping for the reactance tube control loop.

Figure 5:
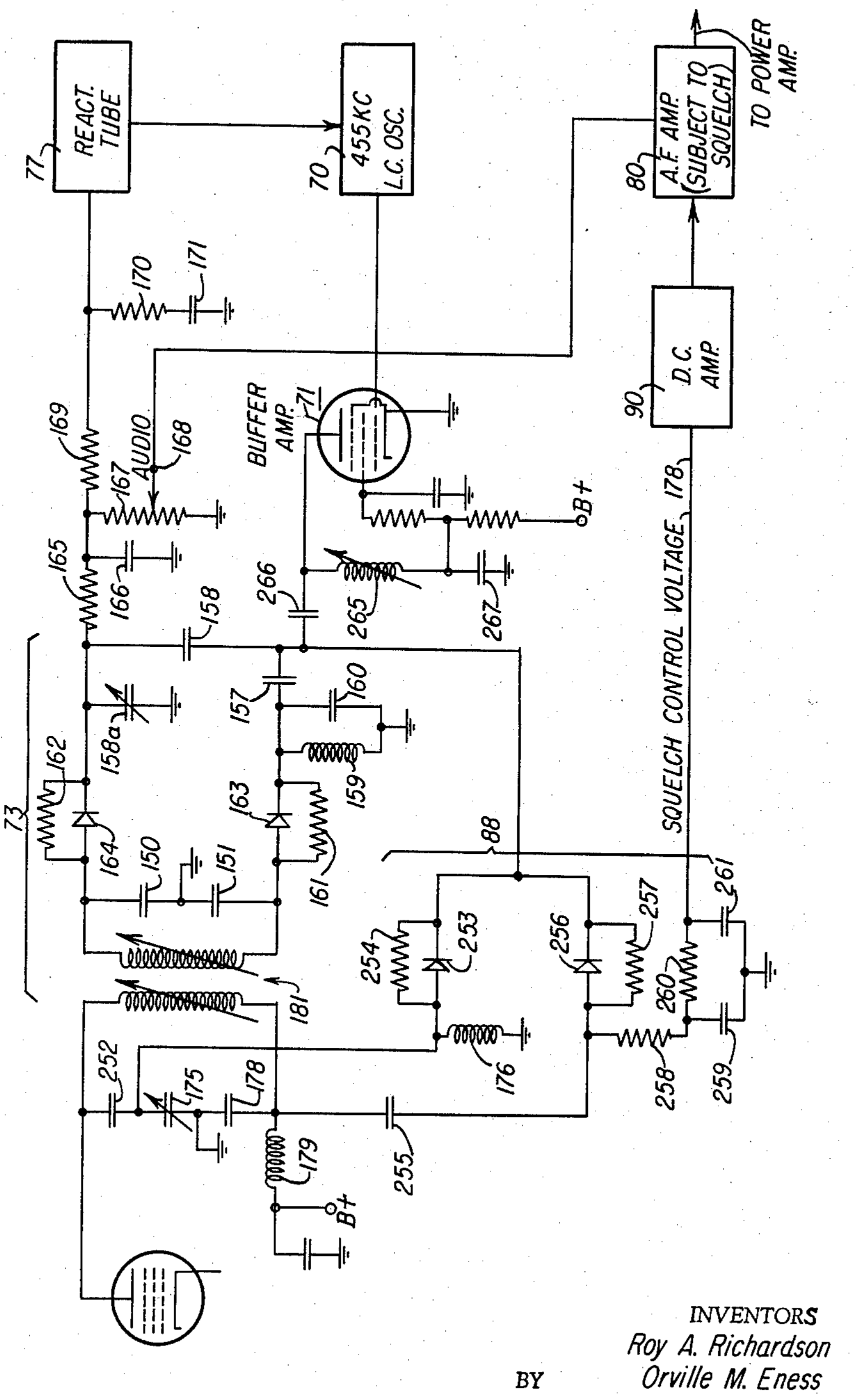
FIG. 5 is a schematic diagram of a portion of the receiver of FIG. 2.

Referring now to FIG. 5, there is shown the phase detector of FIG. 3 coupled to a reactance tube 77 which controls oscillator 70 and provides a reference signal through buffer amplifier 71. The reactance tube responds in a direction to maintain a quadrature relationship between the incoming carrier and the reference oscillator, i.e., if the vector phase drifts in a direction indicating an increase in oscillator frequency as compared with the received carrier frequency the reactance tube responds to reduce the oscillator frequency, and if the vector phase drifts in a direction indicating a decrease in oscillator frequency the exact opposite result occurs.

When the incoming carrier is modulated and therefore has sideband signal components, which may be a single information-carrying tone or a number of sideband signals as in voice modulation, the sideband signals can be represented as additional vectors 203 and 204 rotating on the tip of the carrier vectors 201 and 202 to produce new vectors 207 and 209 changing in phase and amplitude. This effect is shown by vectors 203 and 204 of FIG. 4 which represent single tone sidebands of carrier signals 201 and 202 and which together form the composite vectors 207 and 209 representing the carrier signals with the sideband signals added. When added to reference vector 200, vectors 208 and 210 are formed and these signal components so represented are applied to the diodes (FIGS. 3 and 5) in the same way as the application thereto of signal components represented by vectors 205 and 206 which was previously discussed. The D.C. potentials across each detector are thereby changed to cause the output voltage across resistor 167 of FIG. 5 to vary in accordance with the frequency difference between the carrier and sideband frequency. The beat difference between the reinserted carrier and the incoming sideband is the audible (demodulated) signal which appears across resistor 167. This signal is coupled by lead 168 to the audio frequency amplifier 80 which has its output controlled by D.C. amplifier 90 and the squelch control voltage.

Referring now to FIGS. 5 and 6 which show phase detector 88, or the squelch detector, the generator 251 represents signals developed by one half of the tuned primary of transformer 181, while the generator 250 represents signals developed by the other half thereof (FIG. 5). The reference generator 155 represents signals from buffer amplifier 71 of FIG. 5.

The peak voltage developed by diode 253 is equal to the sum of vector 200 and vector 302, and appears as a positive voltage across capacitor 266. If diode 253 were disconnected the peak voltage developed by diode 256, equal to the sum of vector 200 and vector 300, would appear as a negative voltage across capacitor 255. When diode 253 is reconnected, the voltage appearing across capacitor 266 is added to the peak voltage of diode 256. Since the magnitude of the voltage across capacitor 255 was larger than the voltage across capacitor 266 the addition of these two voltages will be a large negative voltage.

When the incoming carrier and the reference signal from oscillator 70 are operating in phase quadrature, the phase of voltages from generators 250 and 251 are as shown by vectors 300 and 302 of FIG. 7 to be in phase with the reference vector 200. This occurs because the coupling transformer 181 of FIG. 5 has less than critical coupling between primary and secondary, and the resonating components cause a 90° phase shift of the carrier signal between the primary and secondary. In FIG. 7 vector 302 may represent the voltage of generator 251 and vector 300 the voltage of generator 250. It can be seen that the voltage developed by diode 253 appearing on capacitor 266 will be less than the value of the voltage of generator 155 plus that of generator 250 and the voltage developed on capacitor 255 will be negative when the carrier and reference are synchronized.

The presence of the carrier produces a negative D.C. voltage which can be used as a squelch control signal for D.C. amplifier 90 of FIG. 5. This circuit is particularly effective in producing a squelch control signal since noise entering the phase detector circuit does not produce a D.C. voltage in the output signal. Any signal capable of synchronizing the oscillator control loop will provide a detectable squelch control signal even if the carrier amplitude is less than the noise level in the audio circuits.

Resistors 258 and 260 and condensers 259 and 261 provide an effective low pass filter to prevent noise and audio modulation from entering the squelch control circuits. It should be noted that the audio modulation of the incoming signal (represented by vectors 301, 302 which cause a change in signal amplitude applied to diodes 253, 256 as represented by vectors 305 and 304 respectively) is available (by AM detection) from the squelch detector by properly choosing filter components 258—261. The phase detector of FIG. 6 is shown as detector 88 in FIG. 5 and is connected to the D.C. squelch control amplifier 90 by lead 178 and the low pass filter. A negative signal generated by a synchronized carrier develops a positive control signal at the output of the D.C. amplifier to effectively unblock audio amplifier 80.

In a constructed embodiment of the invention, the components of FIG. 5 were as follows:

| | | |
|---|---|---|
| Capacitor **150** | 150 micromicrofarads | matched pairs |
| Capacitor **151** | 150 micromicrofarads | |
| Capacitor **157** | 60 micromicrofarads. | |
| Capacitor **158** | 60 micromicrofarads. | |
| Capacitor **158*a*** | 98–140 micromicrofarads. | |
| Inductor **159** | 6 mh. RF choke. | |
| Capacitor **160** | 170 micromicrofarads. | |
| Resistor **161** | 120,000 ohms | matched pairs |
| Resistor **162** | 120,000 ohms | |
| Diode **163** | Quick recovery silicon diode IN628. | |
| Diode **164** | Quick recovery silicon diode IN628. | |
| Resistor **165** | 100,000 ohms. | |
| Capacitor **166** | 1000 micromicrofarads. | |
| Resistor **167** | 500,000 ohm log taper volume control. | |
| Resistor **169** | 1.5 megohm. | |
| Resistor **170** | 3300 ohms. | |
| Capacitor **171** | 0.25 microfarad. | |
| Capacitor **175** | 88–135 micromicrofarads. | |
| Inductor **176** | 6 mh. (choke). | |
| Capacitor **178** | 100 micromicrofarads. | |
| Inductor **179** | 6 mh. (choke). | |
| Transformer **181** | Primary and secondary 1.3–2.3 mh. (critically coupled). | |
| Diode **253** | Quick recovery silicon diode IN628. | |
| Resistor **254** | 470,000 ohms. | |
| Diode **256** | Quick recovery silicon diode IN628. | |
| Resistor **257** | 470,000 ohms. | |
| Resistor **258** | 1 megohm. | |
| Capacitor **259** | 0.01 microfarad. | |
| Resistor **260** | 1 megohm. | |
| Capacitor **261** | 0.01 microfarad. | |
| Capacitor **252** | 0.01 microfarad. | |
| Capacitor **255** | 0.001 microfarad. | |
| Inductor **265** | 2–4 mh. | |

The frequency of the input signal to the phase control and detector loop was at 455 kc. as provided by the second intermediate frequency amplifier 65. The output coil 265 in buffer amplifier 71 is tuned by the combination of capacitor **158*a*, capacitor 158, capacitor 157, capacitor 160 and blocking capacitor 266, all with the effects of inductor 159 being taken into account. One side of the coil 265 is shown effectively grounded at signal frequencies by means of capacitor 267. The circuit was further constructed so that the voltage at the junction of capacitor 157 and 160 is equal to the voltage of the junction of capacitors 158 and 158*a*. Variable capacitor 158*a* is connected from the junction of resistor 165 and capacitor 158** to ground and is used for balancing purposes.

Figure 8:
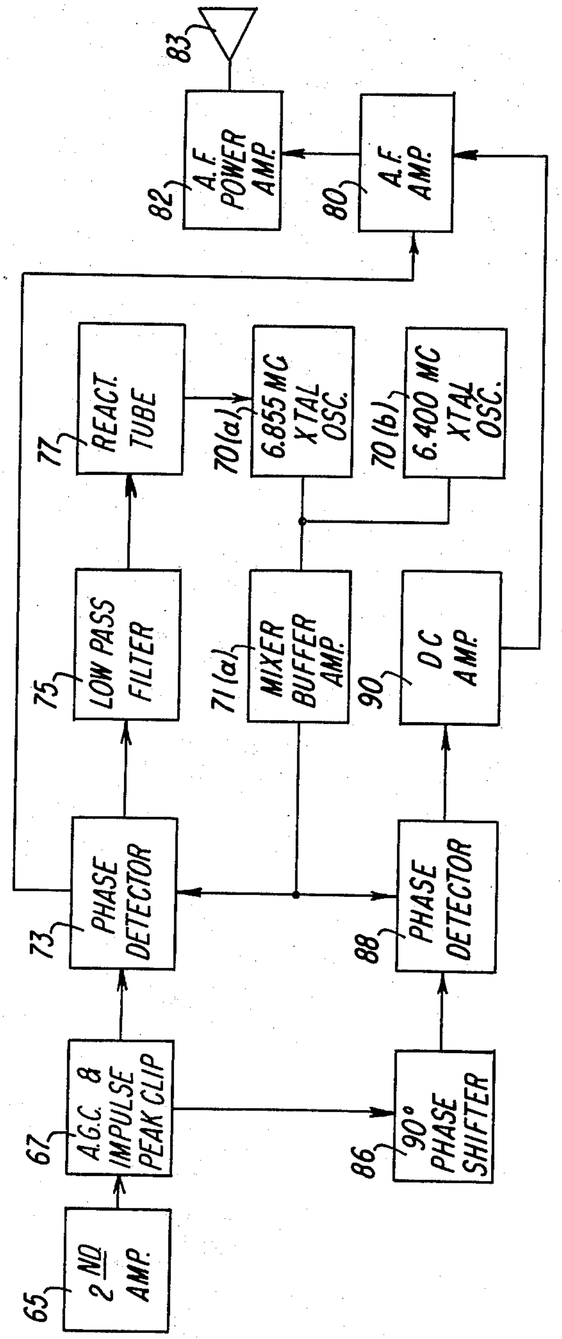
FIG. 8 is a partial block diagram to be taken in conjunction with FIG. 2 to illustrate another form of the invention.

FIG. 8 illustrates a modification of the invention wherein the receiver LC oscillator 70 is replaced by two crystal controlled oscillators, 70(*a*) and 70(*b*). In this form of the invention, sufficient pull-in range is retained in the automatic phase control and detector circuit to facilitate phase-locking to the incoming carrier, but, at the same time, results in improved frequency stability as compared to a standard LC oscillator. This permits a narrower limit on the pull-in range of the phase-locking system. Where the LC oscillator 70 may have exhibited a frequency drift range wide enough to extend into the range of such sideband signals, a crystal oscillator by virtue of its inherent operating characteristics, exhibits a relatively narrow or limited variation in its frequency of operation such that it will tend to remain stable at a frequency outside the locking range of the sideband signal components.

In operation, the 6.855 mc. frequency of crystal oscillator 70(a) is combined with the 6,400 mc. frequency of crystal oscillator 70(b) to provide the 455 kc. reference signal at the output of the mixer-buffer stage 71(a). Likewise, reactance tube 77 controls the precise frequency of crystal oscillator 70(a) in a manner which corresponds to the control of LC oscillator 70 in FIG. 2 to insure phase-locking of the incoming carrier signal at phase detector 73.

Two crystal oscillators in combination such as oscillators 70a and 70b may be necessary to provide the desired 455 kc. reference signal in the manner just described in view of the previously cited characteristic of crystal oscillator exhibiting the narrow variance in its frequency of oscillation. At 455 kc., a signal crystal oscillator might not be sufficiently varied in frequency by the reactance tube 77 to provide the desired pull-in range. In the 6 mc. range, however, the same percentage of variance provides sufficient numerical value of frequency change.

Accordingly, the present invention provides a single sideband communication system utilizing a pilot carrier of reduced power level with respect to the sideband power, thereby permitting carrier recovery and demodulation at the receiver in a simplified phase control loop. Information available in this phase control loop is also used to operate a sensitive squelch circuit to control the receiver output. It should be noted that in addition to utilizing relatively simple circuits, the described system will be particularly adapted for mobile communication use due to the less severe oscillator stability requirements thereof and the fact that a desirable utilization of transmitter power is made.

We claim:

1. A detector for an incoming signal having a carrier of given frequency, including in combination, input circuit means for translating the incoming signal, a first phase detector coupled to said input circuit means, a low pass sub-audio frequency filter connected to said first phase detector, reactance control means coupled to said low pass filter, oscillator circuit means including a first oscillator adapted to be controlled by said reactance control means, a second oscillator, and mixing means connected to said first and second oscillators to produce a reference signal of the given frequency, circuit means for applying the reference signal to said first phase detector for comparison therein with the carrier of the incoming signal and for locking the reference signal and the carrier in 90° phase relation, a second phase detector coupled to said input circuit means and to said oscillator circuit means for comparison of the carrier and the reference signal, and output circuit means connected to said second phase detector and adapted to derive therefrom information of the incoming signal.

2. A receiver for an incoming signal having a carrier portion of given frequency and single sideband modulation information, including in combination, input circuit means for translating the incoming signal, oscillator means including first and second crystal controlled oscillators and mixing means therefor operative to produce a reference signal of the given frequency, carrier locking control means coupled to said oscilator means and responsive to a control potential for locking the reference signal in fixed phase relation with respect to the carrier portion, phase detector means coupled to said input circuit means and to said oscillator means for producing an output signal with a component representing modulation information of the received signal and a further component varying according to a phase difference between the reference signal and the carrier portion of the incoming signal, means coupled to said detector means for utilizing the modulation information of the received signal, and filter means coupled to said detector means and said control means for applying the further component of the output signal to said control means as a control potential for locking the reference signal in the fixed phase relation.

3. A receiver for a signal having a carrier portion of given frequency, including in combination, input circuit means for translating the signal, a first phase detector coupled to said input circuit means, carrier locking control means coupled to said first phase detector to produce a control signal and including oscillator circuit means adapted to be controlled by the control signal and to produce a reference signal of the given frequency, circuit means for applying the reference signal to said first phase detector for comparison therein with the carrier portion for locking the same and the reference signal in fixed phase relation, means for deriving modulation components of the carrier portion from said first phase detector, a second phase detector coupled to said input circuit means and to said oscillator circuit means for comparison of the carrier portion and the reference signal, output circuit means connected to said second phase detector and adapted to produce a control potential in the presence of the carrier portion, and means responsive to the control potential for controlling the receiver thereby.

4. A communication receiver for a received signal having a carrier portion of given frequency and single sideband modulation information of the carrier portion and with the carrier portion power in the range of 13–20 decibels below the peak power of the modulation information, including in combination, input circuit means for translating the received signal, a first phase detector coupled to said input circuit means, a low pass filter including a sub-audio frequency portion connected to said first phase detector, reactance control means coupled to said sub-audio frequency portion of said low pass filter, oscillator circuit means adapted to be controlled by said reactance control means and to produce a reference signal of the given frequency, circuit means for applying the reference signal to said first phase detector for comparison therein with the carrier portion for locking the same and the reference signal in fixed phase relation, means coupled to said low pass filter means for deriving the modulation information therefrom, a second phase detector coupled to said input circuit means and to said oscillator circuit means for comparison of the carrier portion and the reference signal, output circuit means connected to said second phase detector and adapted to produce a control potential in the presence of the carrier portion, and means responsive to the control potential for controlling the receiver thereby.

5. A communication receiver for a received signal having a carrier portion of given frequency and single sideband modulation information of the carrier portion, with the carrier portion power substantially below the power of the modulation information, such receiver including in combination, input circuit means for translating the received signal, a first phase detector coupled to said input circuit means, a low pass sub-audio frequency filter connected to said first phase detector, reactance control means coupled to said low pass filter and controlled by signals therefrom, oscillator circuit means adapted to be controlled by said reactance control means and to produce a reference signal phase locked by the given frequency, circuit means for applying the reference signal to said first phase detector for comparison therein with the carrier portion, means for deriving the modulation information from said first phase detector, a second phase detector coupled to said input circuit means and to said oscillator circuit means and including means for shifting the carrier portion and the reference signal to be in the same phase for comparison of the carrier portion and the reference signal, output circuit means connected to said second phase detector and adapted to derive information of the received signal therefrom to indicate the presence and absence of a carrier portion of a received signal, and squelch circuit means for said receiver controlled by said output circuit means.

6. In a communication system utilizing a single sideband signal including a carrier wave, the power of which is reduced below the peak modulation sideband power by the order of 13–20 decibels, a receiver for such a system including in combination, input circuit means for translating the single sideband signal, an automatic phase control circuit including a first phase detector coupled to said input circuit means, carrier locking circuit means including oscillator circuit means adapted to produce a reference signal locked in 90° phase relation with respect to the carrier wave for comparison to the single sideband signal, translation circuit means for deriving from said first phase detector the modulation component of the sideband information, said translation circuit means being subject to cease translation of signals in response to a control applied thereto, phase shifting circuit means coupled to said input circuit means for shifting the carrier wave by 90°, and a second phase detector coupled to said phase shifting circuit means and said oscillator circuit means to produce a squelch control in the presence of the carrier wave, said second phase detector being coupled to said translation circuit means for applying the squelch control thereto and controlling translation of signals therethrough.

7. A receiver for an incoming signal having a carrier portion of given frequency and single sideband modulation information, including in combination, circuit means for translating the received signal and converting the carrier portion to given frequency, oscillator means operative to produce a reference signal of the given frequency, said oscillator means including first and second crystal controlled oscillators operating in combination and coupled to heterodyning means whereby a reference signal of the given frequency is derived, reactance control means coupled to said first oscillator and responsive to a control potential for locking the reference signal in fixed phase relation with respect to the converted carrier portion of the received signal, said second oscillator operating at a fixed frequency, phase detector means coupled to said heterodyning means and to said signal converting circuit means for producing an output signal with a component varying according to the modulation information of the received signal and a further component varying according to a phase difference between the reference signal and the converted carrier portion of the received signal, and filter means including a radio frequency filter portion coupled to said detector means for deriving the modulation information therefrom and low pass sub-audio frequency filter means coupled to said detector means and said reactance control means for applying the further component of the output signal to said control means for locking the reference signal in the fixed phase relation.

8. A receiver for a signal having a carrier portion of given frequency, including in combination, input circuit means for translating the signal, a first phase detector coupled to said input circuit means, carrier locking control means including oscillator circuit means coupled to said first phase detector to produce a control signal, said oscillator means including a first oscillator adapted to be controlled by the control signal and a second oscillator connected with said first oscillator to mixing means to produce a reference signal of the given frequency, circuit means for applying the reference signal to said first phase detector for comparison therein with the carrier portion for locking the same and the reference signal in fixed phase relation, means for deriving modulation components of the carrier portion from said first phase detector, a second phase detector coupled to said input circuit means and to said oscillator circuit means for comparison of the carrier portion and the reference signal, output circuit means connected to said second phase detector and adapted to produce a control potential in the presence of the carrier portion, and means responsive to the control potential for controlling the receiver thereby.

9. A communications receiver for a received signal having a carrier portion of given frequency and single sideband modulation information of the carrier portion, with the carrier portion power substantially below the power of the modulation information, such receiver including in combination, input circuit means for translating the received signal, a first phase detector coupled to said input circuit means, a low pass sub-audio frequency filter connected to said first phase detector, reactance control means coupled to said low pass filter and controlled by signals therefrom, oscillator means including a first oscillator adapted to be controlled by said reactance control means and a second oscillator connected with said first oscillator to mixing means to produce a reference signal phase-locked by the given frequency, circuit means for applying the reference signal to said first phase detector for comparison therein with the carrier portion, means for deriving the modulation information from said first phase detector, a second phase detector coupled to said input circuit means and to said oscillator circuit means and including means for shifting the carrier portion and the reference signal to be in the same phase for comparison of the carrier portion and the reference signal, output circuit means connected to said second phase detector and adapted to derive information of the received signal therefrom to indicate the presence and absence of a carrier portion of a received signal, and squelch circuit means for said receiver controlled by said output circuit means.

References Cited in the file of this patent

UNITED STATES PATENTS

| | | |
|---|---|---|
| 2,567,286 | Hugenholtz | Sept. 11, 1951 |

FOREIGN PATENTS

| | | |
|---|---|---|
| 453,858 | Great Britain | Sept. 21, 1936 |
| 519,026 | Italy | Mar. 10, 1955 |